United States Patent
Kim et al.

(10) Patent No.: US 9,543,076 B2
(45) Date of Patent: Jan. 10, 2017

(54) ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: Moon Il Kim, Chungcheongnam-do (KR); Byoung Hwa Lee, Suwon-si (KR); Doo Hwan Lee, Chungcheongnam-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 286 days.

(21) Appl. No.: 14/144,384

(22) Filed: Dec. 30, 2013

(65) Prior Publication Data
US 2014/0185188 A1  Jul. 3, 2014

(30) Foreign Application Priority Data
Dec. 31, 2012  (KR) .......................... 10-2012-0158338

(51) Int. Cl.
*H01G 4/228*  (2006.01)
*H01G 4/30*  (2006.01)
*H01G 4/232*  (2006.01)

(52) U.S. Cl.
CPC ............... *H01G 4/30* (2013.01); *H01G 4/232* (2013.01)

(58) Field of Classification Search
USPC .................................... 361/306.3, 308.1, 309
See application file for complete search history.

(56) References Cited

U.S. PATENT DOCUMENTS

| | | | | |
|---|---|---|---|---|
| 4,771,520 A * | 9/1988 | Tanaka | ...................... | H01G 4/30 29/25.42 |
| 5,712,758 A * | 1/1998 | Amano | ................ | H01G 4/2325 361/306.3 |
| 7,075,775 B2 * | 7/2006 | Yamazaki | ................ | H01C 1/02 338/237 |
| 8,861,180 B2 * | 10/2014 | Lee | ........................ | H01G 4/008 361/301.2 |
| 8,861,181 B2 * | 10/2014 | Lee | ........................ | H01G 4/008 361/301.2 |
| 2009/0053853 A1 * | 2/2009 | Onodera | .............. | H01G 4/2325 438/106 |

(Continued)

FOREIGN PATENT DOCUMENTS

CN   102683015 A   9/2012
JP   09-129476 A   5/1997

(Continued)

OTHER PUBLICATIONS

Taiwanese Office Action issued in Taiwanese application No. 102134639 dated Aug. 21, 2014, w/Partial English translation.

*Primary Examiner* — Eric Thomas
(74) *Attorney, Agent, or Firm* — NSIP Law (57) ABSTRACT

Disclosed herein are an electronic component and a method of manufacturing the same. In an electronic component having a conductor formed in an insulator and providing an external electrode electrically connected to the conductor on an outer surface of the insulator, a curvature of the external electrode in a via machining region is decreased at a predetermined level or less, thereby making it possible to decrease defect generation due to a glare-reflection of a laser.

12 Claims, 5 Drawing Sheets

(56) References Cited

U.S. PATENT DOCUMENTS

2012/0006469 A1 1/2012 Inagaki et al.

FOREIGN PATENT DOCUMENTS

| JP | 2005-123407 A | 5/2005 |
|---|---|---|
| JP | 4433909 B2 | 3/2010 |
| JP | 2010-123865 A | 6/2010 |
| JP | 2012-028465 A | 2/2012 |
| KR | 10-1050674 B1 | 7/2011 |

* cited by examiner

ELECTRONIC COMPONENT AND METHOD OF MANUFACTURING THE SAME

CROSS REFERENCE(S) TO RELATED APPLICATIONS

This application claims the foreign priority benefit of Korean Patent Application No. 10-2012-0158338, entitled "Electronic Component and Method of Manufacturing the Same" filed on Dec. 31, 2012, which is hereby incorporated by reference in its entirety into this application.

BACKGROUND OF THE INVENTION

1. Technical Field

The present invention relates to an electronic component and a method of manufacturing the same.

2. Description of the Related Art

In accordance with improved portability and high performance of an electronic device, while an effort to provide more functions in a smaller volume is continuously conducted, a technology embedding an electronic component in a substrate has been spotlighted as part of a next generation multi-functional and small package technologies.

As an example, Patent Document 1 discloses the circuit substrate in which the electronic component is embedded.

For example, in the case in which the multilayer ceramic capacitor (MLCC) is embedded in the circuit substrate, an external electrode of the MLCC may be connected to a circuit pattern of the circuit substrate through a via. However, as a size of the MLCC is minimized, it is difficult to form the external electrode connected to the via so as to have a uniform shape. Therefore, a problem of reliable connection to the via, or the like may be generated.

RELATED ART DOCUMENT

Patent Document (Patent Document 1) US Patent Laid-Open Publication No. 2012-0006469

SUMMARY OF THE INVENTION

An object of the present invention is to provide an electronic component capable of decreasing a glare reflection phenomenon of a laser and a method of manufacturing the same.

According to an exemplary embodiment of the present invention, there is provided an electronic component having a conductor formed in an insulator, providing an external electrode electrically connected to the conductor on an outer surface of the insulator, and having a size of a width of 1.0 mm by a height of 0.5 mm or less, wherein a maximum value of a curvature of the external electrode may be 7° or less.

According to another exemplary embodiment of the present invention, there is provided an electronic component having a conductor formed in an insulator, providing an external electrode electrically connected to the conductor on an outer surface of the insulator, and having a size of a width of 1.0 mm by a height of 0.5 mm or less, wherein a maximum value of a curvature of the external electrode in a via machining region of the external electrode may be 7° or less.

The via machining region may be a region corresponding to 90% based on the center of a bandwidth of the external electrode of a surface of the external electrode.

According to another exemplary embodiment of the present invention, there is provided an electronic component including a body part of a rectangular parallelepiped shape having a long-axis, a short-axis, and a height, and an external electrode provided at both ends of the body part in a long-axis direction, wherein a maximum value of an acute angle that a virtual straight line connecting between a highest point having a highest height from a surface of the body part of a surface of the external electrode and points positioned on a boundary line of a first via machining region of points on the surface of the external electrode and having a nearest distance from the highest point forms with a surface parallel to the long-axis direction may be 1 to 7°, and the first via machining region may be a region corresponding to 90% in the long-axis direction based on the center of a first bandwidth which is the maximum width of the external electrode in the long-axis direction.

A maximum value of an acute angle that a virtual straight line connecting between a highest point having a highest height from a surface of the body part of a surface of the external electrode and points positioned on a boundary line of a second via machining region of points on the surface of the external electrode and having a nearest distance from the highest point forms with a surface parallel to the short-axis direction may be 1 to 7°, and the second via machining region may be a region corresponding to 90% in the short-axis direction based on the center of a second bandwidth which is the maximum width of the external electrode in the short-axis direction.

The electronic component may be a multilayer ceramic capacitor (MLCC).

The MLCC may have a long-axis length of 1.0 mm or less and a short-axis length of 0.5 mm or less.

The MLCC may have the long-axis length of 0.6 mm or less and the short-axis length of 0.3 mm or less.

According to another exemplary embodiment of the present invention, there is provided a method of manufacturing an electronic component having a conductor formed in an insulator and providing an external electrode electrically connected to the conductor on an outer surface of the insulator, the method including: dipping a body part in a surface plate in which electrode paste having viscosity of 800 to 18,000 cps is immersed; and blotting the dipped body part.

In the blotting of the dipped body part, the body part may be blotted on the surface plate in which the electro paste is immersed at a height of ¼ or less of a height of the electro paste in the dipping of the body part.

The blotting of the dipped body part may be performed for 2 to 40 seconds.

DESCRIPTION OF THE PREFERRED EMBODIMENTS

Various advantages and features of the present invention and methods accomplishing thereof will become apparent from the following description of exemplary embodiments with reference to the accompanying drawings. However, the present invention may be modified in many different forms and it should not be limited to exemplary embodiments set forth herein. These exemplary embodiments may be provided so that this disclosure will be thorough and complete, and will fully convey the scope of the invention to those skilled in the art. Like reference numerals denote like elements throughout the description.

Terms used in the present specification are for explaining exemplary embodiments rather than limiting the present invention. Unless specifically mentioned otherwise, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

For simplification and clearness of illustration, a general configuration scheme will be shown in the accompanying drawings, and a detailed description of the feature and the technology well known in the art will be omitted in order to prevent a discussion of exemplary embodiments of the present invention from being unnecessarily obscure. Additionally, components shown in the accompanying drawings are not necessarily shown to scale. For example, sizes of some components shown in the accompanying drawings may be exaggerated as compared with other components in order to assist in the understanding of the exemplary embodiments of the present invention. Like reference numerals on different drawings will denote like components, and similar reference numerals on different drawings will denote similar components, but are not necessarily limited thereto.

In the specification and the claims, terms such as "first", "second", "third", "fourth", and the like, if any, will be used to distinguish similar components from each other and be used to describe a specific sequence or a generation sequence, but is not necessarily limited thereto. It may be understood that these terms are compatible with each other under an appropriate environment so that exemplary embodiments of the present invention to be described below may be operated in a sequence different from a sequence shown or described herein. Likewise, in the present specification, in the case in which it is described that a method includes a series of steps, a sequence of these steps suggested herein is not necessarily a sequence in which these steps may be executed. That is, any described step may be omitted and/or any other step that is not described herein may be added to the method.

In the specification and the claims, terms such as "left", "right", "front", "rear", "top", "bottom", "over", "under", and the like, if any, do not necessarily indicate relative positions that are not changed, but are used for description. It may be understood that these terms are compatible with each other under an appropriate environment so that exemplary embodiments of the present invention to be described below may be operated in a direction different from a direction shown or described herein. A term "connected" used herein is defined as being directly or indirectly connected in an electrical or non-electrical scheme. Targets described as being "adjacent to" each other may physically contact each other, be close to each other, or be in the same general range or region, in the context in which the above phrase is used. Here, a phrase "in an exemplary embodiment" means the same exemplary embodiment, but is not necessarily limited thereto.

Hereinafter, a configuration and an acting effect of exemplary embodiments of the present invention will be described in more detail with reference to the accompanying drawings.

Since it is difficult to form a circuit pattern in a region in which an electronic component is embedded, an effort to decrease a size of the embedded electronic component is continuously conducted.

Particularly, in a case of a chip part such as an MLCC, an inductor, or the like, an attempt to commercialize a product having a size of a width of 1.0 mm by a height of 0.5 mm (so-called and also referred to as a 1005 size product) is currently conducted and an effort to further miniaturize the products is continued, such that it is expected that a product having a size of a width of 0.6 mm by a height of 0.3 mm (so-called and also referred to as a 0603 size product) will be commercialized.

In most electronic components, however, as the electronic component is miniaturized, there is a need to narrow the bandwidth as well and the decrease of the bandwidth may affect a shape of the external electrode.

Figure 1:
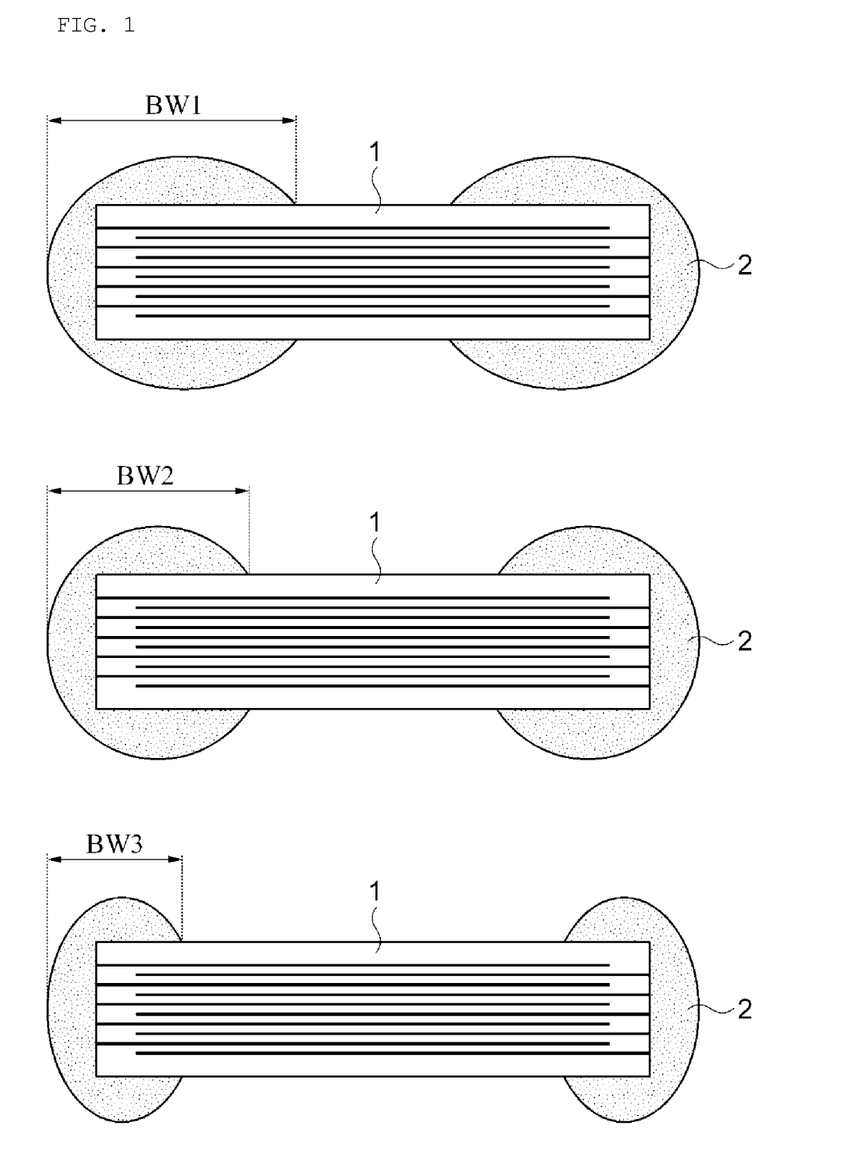
FIG. 1 is a view schematically showing a relationship between a bandwidth of an external electrode of an electronic component and a curvature of the external electrode.

FIG. 1 is a view schematically showing a relationship between a bandwidth of an external electrode of an electronic component and a curvature of the external electrode.

As shown in FIG. 1, in the case in which an external electrode 2 is formed in a dipping method, even though an electronic component 1 has the same size, as the bandwidth becomes narrower, a curvature of the external electrode 2 becomes larger. That is, the curvature of the external electrode 2, particularly, the curvature of a via machining region becomes larger toward BW2 or BW3 as compared to BW1 having the smallest bandwidth, such that a glare reflection phenomenon of laser light is further intensified.

Figure 2:
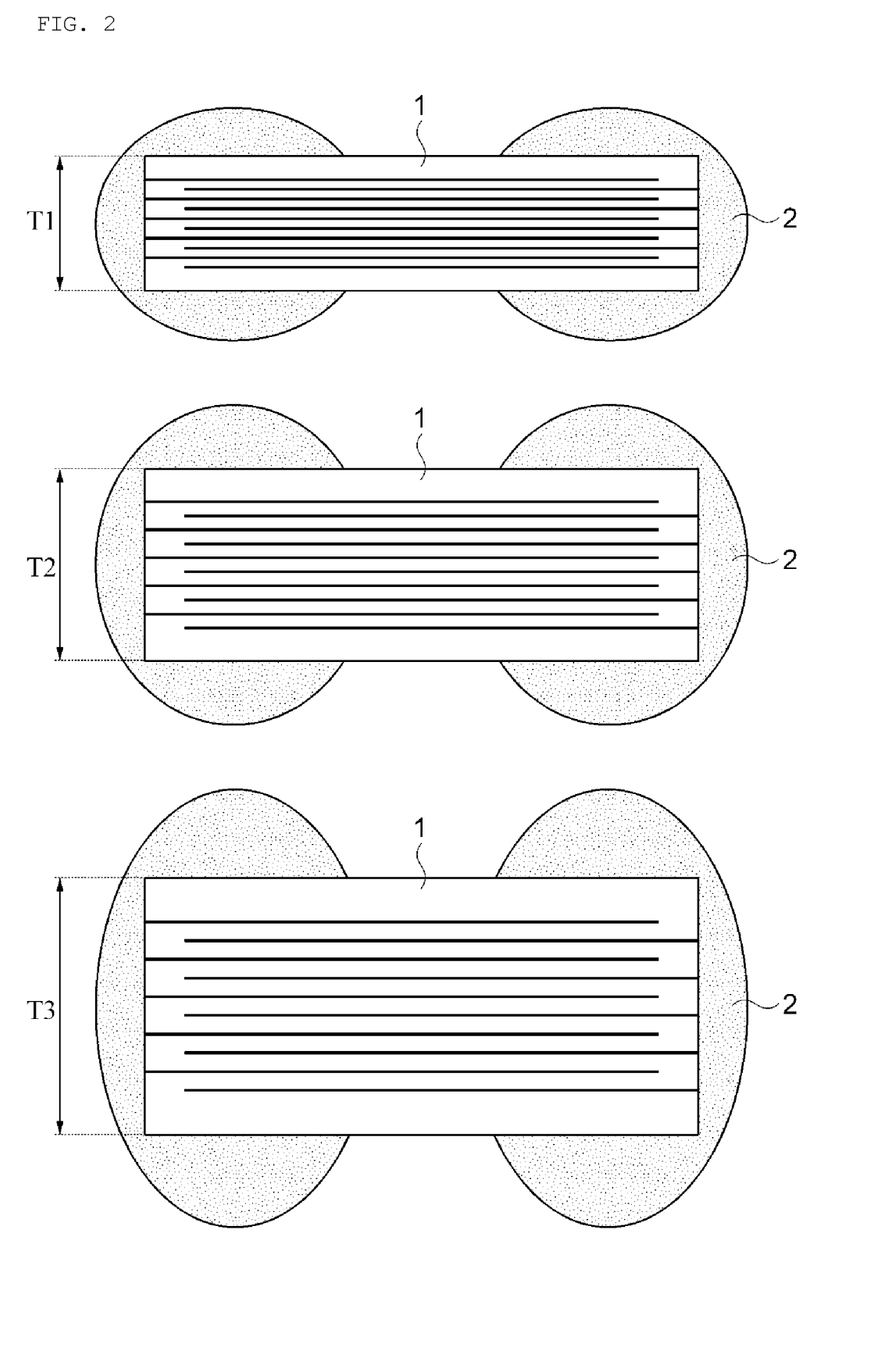
FIG. 2 is a view schematically showing a relationship between a thickness of the electronic component and the curvature of the external electrode.

FIG. 2 is a view schematically showing a relationship between a thickness of the electronic component and the curvature of the external electrode.

As shown in FIG. 2, even in the case of in which the size of the electronic component 1 and the bandwidth of the external electrode 2 are the same, as a thickness of the electronic component 1 is increased, the curvature of the external electrode 2 becomes larger. That is, it may be appreciated that the curvature of the external electrode 2, particularly, the curvature of the via machining region becomes larger toward T3 as compared to T1 having the smallest thickness.

Meanwhile, in order to decrease the overall height of a semiconductor package and to reduce the cost, a trend is changing from a package of a through mold via (TMV) type using MUF to a bare die package on package using CUF.

The above-mentioned bare die package on package is designed to have a thickness of a core increased up to 150 μm to 250 μm in order to improve high-temperature warpage characteristics of the substrate.

Therefore, in order to embed the electronic component in the bare die package on package, the thickness of the embedded electronic component needs to be increased. As a result, an MLCC having a thickness 50 µm to 100 µm or more thicker than that of an embedded-only MLCC is demanded.

Therefore, since a situation in which the MLCC thicker than the existing MLCC is demanded is also a factor increasing the curvature of the external electrode, the glare reflection phenomenon of the laser light may be intensified.

Meanwhile, in forming the external electrode in the case of a general electronic component according to the related art, a plating method may be applied. In the case in which the plating method is applied, since the external electrode may be formed in a thin film shape on an outer surface of the electrode component, the problem of the curvature of the external electrode is not caused.

In accordance with the miniaturization of the electronic component as described above, however, it is difficult to form the external electrode using the plating method, or the like as in the related art. Currently, in order to form the external electrode in a case of an ultra-miniaturized electronic component, so-called a dipping method in which a part of the electronic component is deposited in an electrode paste so as to smear and then cure the electrode paste at a location at which the external electrode is formed is applied.

In the case in which the external electrode is formed using the above-mentioned dipping method, the external electrode has a round shape due to surface tension of the electrode paste.

In addition, the via is formed so as to be electrically connected to the outside while a miniaturized electronic component is embedded in the substrate. In this case, as a width (so-called and also referred to as a bandwidth (BW)) of the external electrode is wider, connectivity to the via is excellent and via machining efficiency is improved.

However, in the case of the MLCC or the like in which a plurality of external electrodes are provided and the external electrodes need to be electrically separated, as the size of the MLCC is miniaturized, a maximal bandwidth which may be implemented while a short is prevented has a limitation.

In addition, in the case of in which much electrode paste are smeared on the external electrode in order to maximally secure the bandwidth, the curvature of the external electrode becomes larger.

In this case, in the case of a via connecting method generally used to electrically connect the electronic component to the outside in a field of the electronic component embedding substrate, a via hole exposing the external electrode of the electronic component is machined by irradiating laser. In this process, the laser is glare-reflected from a surface of the external electrode having a large curvature, such that the laser reaches up to a region not to be machined, thereby causing defect of the via formation.

Figure 3:
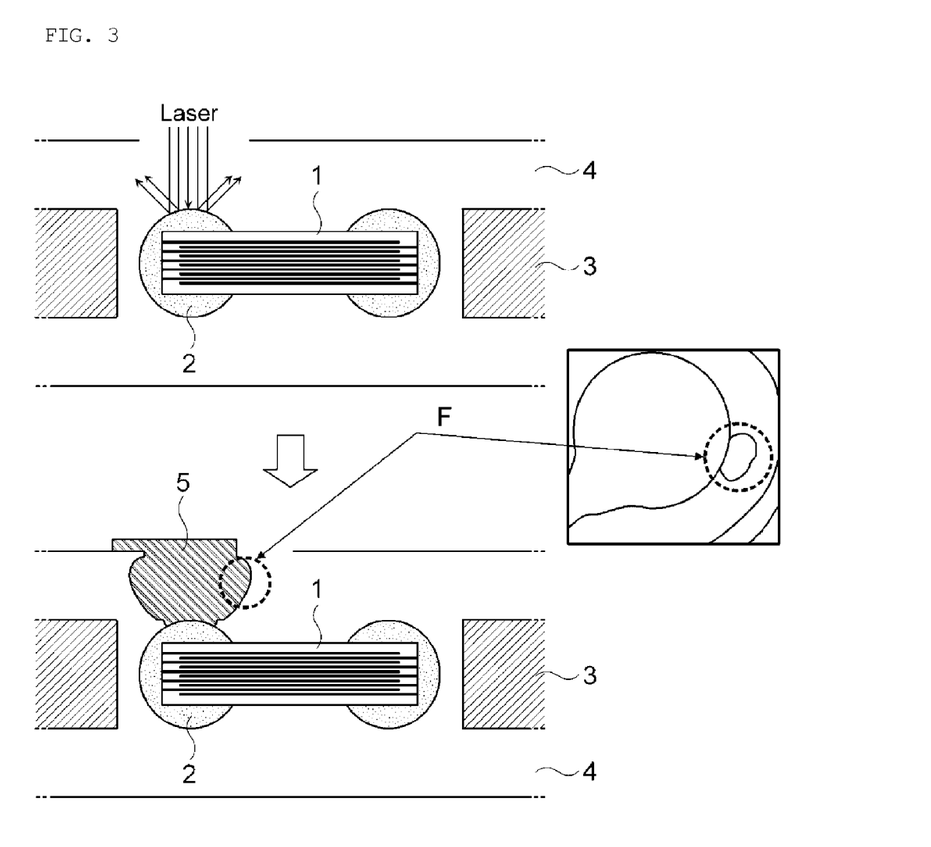
FIG. 3 is a view for describing a principle in which a defect is generated in a via hole machining process for forming a via to be connected to the external electrode in a state in which the electronic component is embedded in a substrate.

FIG. 3 is a view for describing a principle in which a defect is generated in a via hole machining process for forming a via to be connected to the external electrode in a state in which the electronic component is embedded in a substrate.

Referring to FIG. 3, in the case in which the electronic component is embedded in a cavity of a core substrate 3 and a build-up insulating layer 4 is formed on the electronic component 1 and the core substrate 3, in order to machine a via 5 electrically connected to the external electrode 2, a laser is irradiated.

In this case, the laser is glare-reflected from the surface of the external electrode 2, thereby unnecessarily further machining the build-up insulating layer 4. As a result, defect F is generated in a process in which a conductive material is filled into the via hole.

Figure 4A:
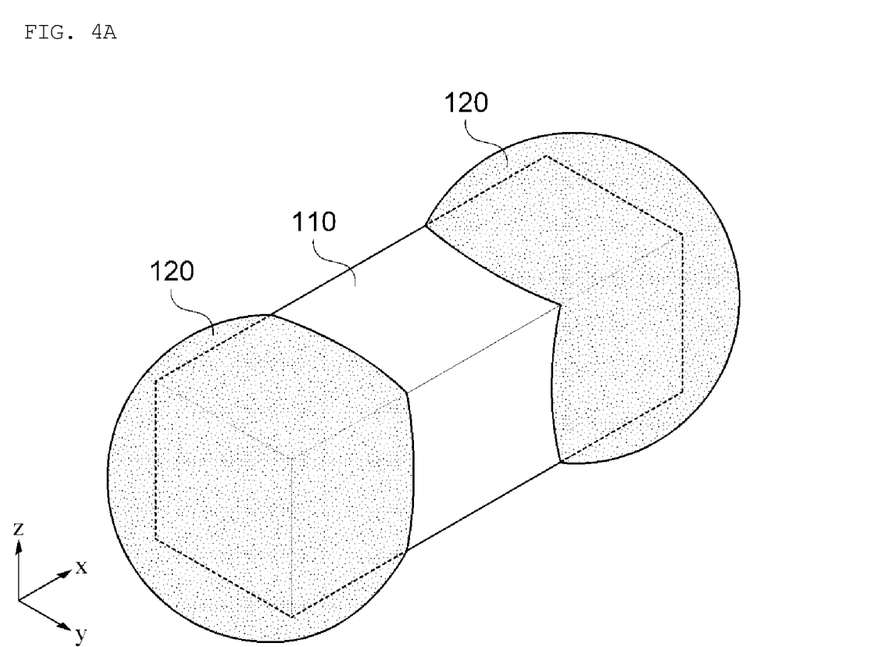
FIG. 4A is a perspective view schematically showing an electronic component according to an exemplary embodiment of the present invention.
Figure 4B:
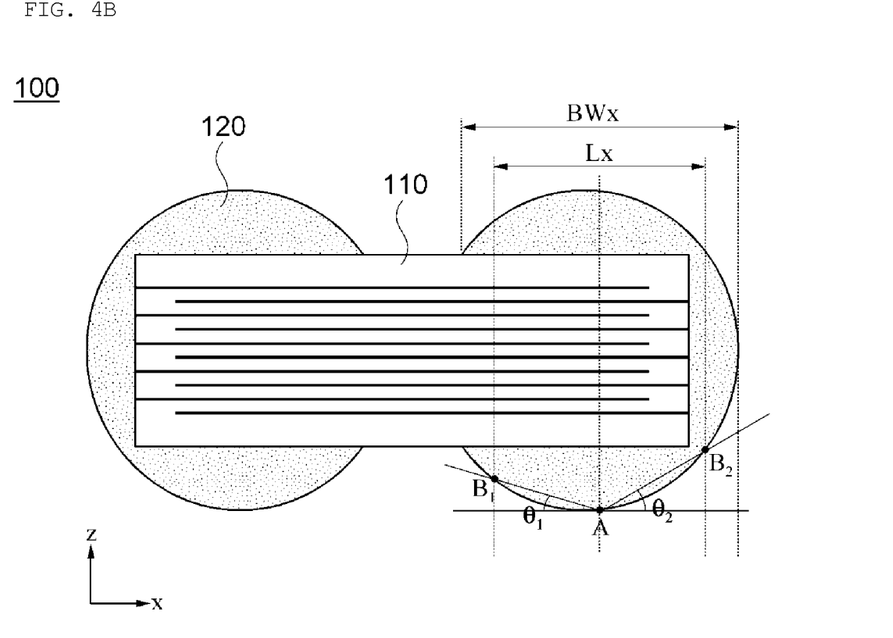
FIG. 4B is a schematic cross-sectional view taken along an X-Z plan of the electronic component according to the exemplary embodiment of the present invention.
Figure 4C:
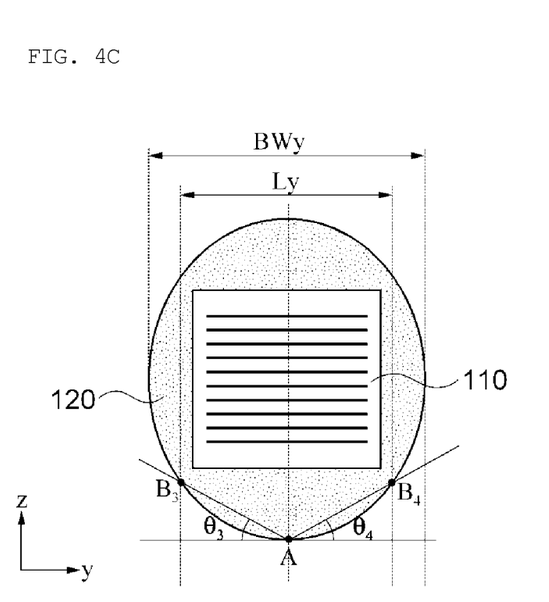
FIG. 4C is a schematic cross-sectional view taken along a Y-Z plan of the electronic component according to the exemplary embodiment of the present invention.

FIG. 4A is a perspective view schematically showing an electronic component 100 according to an exemplary embodiment of the present invention, FIG. 4B is a schematic cross-sectional view taken along an X-Z plan of the electronic component 100 according to the exemplary embodiment of the present invention, and FIG. 4C is a schematic cross-sectional view taken along a Y-Z plan of the electronic component according to the exemplary embodiment of the present invention.

In an electronic component 100 according to an exemplary embodiment of the present invention, an external electrode 120 has a maximum value of curvature of 7° or less, thereby making it possible to solve the foregoing problems.

Referring to FIGS. 4A to 4C, the electronic component 100 according to the exemplary embodiment of the present invention may be formed by forming a conductor in an insulator and providing the external electrode 120 electrically connected to the conductor on an outer surface of the insulator.

In this case, the insulator may be ceramic, or the like, and a body part 110 may include the insulator and the conductor.

The external electrodes 120 are provided at both ends in a long-axis direction of the body part 110. Here, the long-axis direction means a direction parallel to an X-axis, and the external electrode 120 may be formed in the dipping method. In addition, a short-axis direction of the body part 110 may mean a direction parallel to a Y-axis.

Meanwhile, it is important for the external electrode 120 to have a small curvature, but above all things, it is more important that the curvature of the via machining region irradiating the laser is formed to be small at a predetermined range or less.

In this case, the via machining region is a region corresponding to 90% of the bandwidth.

Referring to FIG. 4B, a maximum width of the external electrode 120 in the long-axis direction of the electronic component 100 may be defined as a first bandwidth BWx.

In addition, a first via machining region Lx may be a region corresponding to 90% in the long-axis direction based on the center of the first bandwidth BWx.

In consideration of a position tolerance, a via hole machining tolerance, and the like generated during a process of mounting the electronic component 100, the via may be positioned at the center of the external electrode 120 in order to secure connectivity between the external electrode 12 and the via.

Therefore, the first via machining region Lx may also be positioned at the central portion of the first bandwidth BWx and may have clearance of at least about 5% from the first bandwidth BWx to one side the first via machining region Lx.

Meanwhile, in limiting the curvature of the via machining region, the following methods are also possible.

As shown in FIG. 4B, the highest point or the lowest point of the external electrode 120, that is, a point on the surface of the external electrode 120 farthest away from the body part 110 may be defined as A.

Among points at which a boundary line of the first via machining region Lx is intersected with the surface of the external electrode 120, the points nearest from the above-mentioned point A may be defined as B1 and B2.

In addition, an acute angle that a line passing through the point A and parallel to the long-axis of the body part 110 forms with a virtual straight line connecting between the points A and B1, and a virtual straight line connecting between the points A and B2 may be defined as $\theta_1$ and $\theta_2$, respectively.

In addition, as a result of experimenting a degree of generation of the glare reflection of a laser while changing $\theta_1$ and $\theta_2$, it was confirmed that when the maximum value of $\theta_1$ and $\theta_2$ is 7° or less, the glare-reflection is hardly generated.

Meanwhile, when the maximum value of $\theta_1$ and $\theta_2$ becomes 1° or less, the first bandwidth BWx becomes too large, such that a case in which the short phenomenon of the external electrode 120 is generated was founded.

Therefore, the maximum value of the $\theta_1$ and $\theta_2$ may be in a range of 1 to 7°.

Referring to FIG. 4C, a maximum width of the external electrode 120 in the short-axis direction of the electronic component 100 may be defined as a second bandwidth BWy.

In addition, a second via machining region Ly may be a region corresponding to 90% in the long-axis direction based on the center of the second bandwidth BWy.

In consideration of a position tolerance, a via hole machining tolerance, and the like generated during a process of mounting the electronic component 100, the via may be positioned at the center of the external electrode 120 in order to secure connectivity between the external electrode 120 and the via.

Therefore, the second via machining region Ly may also be positioned at the central portion of the second bandwidth BWy and may have clearance of at least about 5% from the second bandwidth BWy to one side of the second via machining region Ly.

In addition, with a principle similar to the above-mentioned features, as shown in FIG. 4C, the highest point or the lowest point of the external electrode 120, that is, a point on the surface of the external electrode 120 farthest away from the body part 110 may be defined as A.

Among points at which a boundary line of the second via machining region Ly is intersected with the surface of the external electrode 120, the points nearest from the above-mentioned point A may be defined as B3 and B4.

In addition, an acute angle that a line passing through the point A and parallel to the short-axis of the body part 110 forms with a virtual straight line connecting between the points A and B3, and a virtual straight line connecting between the points A and B4 may be defined as $\theta_3$ and $\theta_4$, respectively.

In addition, as a result of experimenting a degree of generation of the glare reflection of a laser while changing $\theta_3$ and $\theta_4$, it was confirmed that when the maximum value of $\theta_3$ and $\theta_4$ is 7° or less, the glare-reflection is hardly generated.

Meanwhile, when the maximum value of $\theta_3$ and $\theta_4$ becomes 1° or less, the first bandwidth BWx becomes too large, such that a case in which the short phenomenon of the external electrode 120 is generated was founded.

Therefore, the maximum value of the $\theta_3$ and $\theta_4$ may be in a range of 1 to 7°.

Meanwhile, a method of manufacturing an electronic component 100 according to an exemplary embodiment of the present invention forms the external electrode 120 on the body part 110, performs a typical dipping and then performs blotting.

In this case, viscosity of the electrode paste used in the process of performing the dipping and the process of performing the blotting needs to be in a predetermined range.

When the viscosity of the electrode paste is too low, sufficient paste does not remain in the body part 110 and the bandwidth becomes too wide, such that the short phenomenon may be generated between the external electrodes 120.

In addition, when the viscosity of the electrode paste is too high, the curvature of the external electrode 120 is increased, such that the frequency that the glare-reflection phenomenon of the laser generates is increased.

Therefore, the method of manufacturing the electronic component 100 according to the exemplary embodiment of the present invention may use the electrode paste having the viscosity of 800 to 18,000 cps in the process of performing the dipping and the blotting.

Meanwhile, in the dipping, the body part 110 is deposited in the electrode paste and the body part 110 may be deposited at a depth of about the bandwidth of the external electrode 120.

When the dipping is performed, the electrode paste is smeared on the body part 110 and the curvature of the external electrode 120 is increased due to the surface tension of the electrode paste.

Therefore, the curvature of the external electrode 120 may be decreased by performing the blotting on the electronic component 100 in which the dipping is performed.

In this case, the blotting may be performed in a scheme in which the electronic component 100 performing the dipping is deposited in a surface plate having the electrode paste immersed therein at a height lower than the depth that the body part 110 is deposited in the dipping. Here, a process that the electronic component 100 collides with a bottom of the surface plate by a predetermined force may be repeated.

In addition, when performing the blotting, in the case in which a height from the surface plate to the surface of the electrode paste is too high, since the electrode paste smeared on the body part 110 may not be sufficiently taken off, the height from the surface plate to the surface of the electrode paste may be ¼ or less of the height of the electrode paste in the dipping.

The curvature of the external electrode 120 may be adjusted by the above-mentioned dipping. In other words, flatness of the external electrode 120 may be adjusted by performing the blotting.

Meanwhile, the curvature or flatness of the external electrode 120 may also be changed according to time performing the blotting.

In the case in which the blotting is performed during a very short time, the external electrode 120 may not be implemented so as to be sufficiently flat, and in the case in which the blotting is performed during a very long time, the flatness of the external electrode 120 may become too large.

Therefore, the method of manufacturing the electronic component 100 according to the exemplary embodiment of the present invention may perform the blotting in a range of 2 to 30 seconds.

According to the exemplary embodiment of the present invention, when the via hole is machined with the laser in the process embedding the electronic component in the substrate, the glare reflection phenomenon may be decreased, thereby making it possible to decrease the incidence rate of the defective via.

In addition, the defect generated due to the short of the plurality of external electrodes may be solved.

What is claimed is:
1. An electronic component comprising:
a body part of a rectangular parallelepiped shape having a long-axis, a short-axis, and a height, and an external electrode provided at both ends of the body part in a long-axis direction, wherein a maximum value of an acute angle that a virtual straight line connecting between a highest point having a highest height from a surface of the body part of a surface of the external electrode and points positioned on a boundary line of a first via machining region of points on the surface of the external electrode and having a nearest distance from the highest point forms with a surface parallel to the long-axis direction is 1 to 7°, wherein a maximum width of the external electrode in the long-axis direction is a first bandwidth, and wherein the first via machining region is an internal region having clearance of at least about 5% from both sides of the first bandwidth.

2. The electronic component according to claim 1, wherein a maximum value of an acute angle that a virtual straight line connecting between a highest point having a highest height from a surface of the body part of a surface of the external electrode and points positioned on a boundary line of a second via machining region of points on the surface of the external electrode and having a nearest distance from the highest point forms with a surface parallel to the short-axis direction is 1 to 7°, and wherein a maximum width of the external electrode in the short-axis direction is a second bandwidth, and wherein the second via machining region is an internal region having clearance of at least about 5% from both sides of the second bandwidth.

3. The electronic component according to claim 2, wherein the electronic component is a multilayer ceramic capacitor (MLCC).

4. The electronic component according to claim 3, wherein the MLCC has a long-axis length of 1.0 mm or less and a short-axis length of 0.5 mm or less.

5. The electronic component according to claim 4, wherein the MLCC has the long-axis length of 0.6 mm or less and the short-axis length of 0.3 mm or less.

6. The electronic component of claim 2, wherein the second via machining region is a region corresponding to 90% in the short-axis direction based on the center of a second bandwidth which is the maximum width of the external electrode in the short-axis direction.

7. The electronic component of claim 1, wherein the first via machining region is a region corresponding to 90% in the long-axis direction based on the center of a first bandwidth which is the maximum width of the external electrode in the long-axis direction.

8. An electronic component comprising:
a body part of a rectangular parallelepiped shape having a long-axis, a short-axis, and a height, and
an external electrode provided at both ends of the body part in a long-axis direction,
wherein a maximum value of an acute angle that a virtual straight line connecting between a highest point having a highest height from a surface of the body part of a surface of the external electrode and points positioned on a boundary line of a first via machining region of points on the surface of the external electrode and having a nearest distance from the highest point forms with a surface parallel to the long-axis direction is 1 to 7°, and the first via machining region is a region corresponding to 90% in the long-axis direction based on the center of a first bandwidth which is the maximum width of the external electrode in the long-axis direction.

9. The electronic component according to claim 8, wherein a maximum value of an acute angle that a virtual straight line connecting between a highest point having a highest height from a surface of the body part of a surface of the external electrode and points positioned on a boundary line of a second via machining region of points on the surface of the external electrode and having a nearest distance from the highest point forms with a surface parallel to the short-axis direction is 1 to 7°, and the second via machining region is a region corresponding to 90% in the short-axis direction based on the center of a second bandwidth which is the maximum width of the external electrode in the short-axis direction.

10. The electronic component according to claim 9, wherein the electronic component is a multilayer ceramic capacitor (MLCC).

11. The electronic component according to claim 10, wherein the MLCC has a long-axis length of 1.0 mm or less and a short-axis length of 0.5 mm or less.

12. The electronic component according to claim 11, wherein the MLCC has the long-axis length of 0.6 mm or less and the short-axis length of 0.3 mm or less.

* * * * *